Dec. 28, 1937. R. C. OSTERSTROM Re. 20,605
METHOD OF TREATING CRACKED PETROLEUM DISTILLATES
Original Filed Feb. 5, 1930
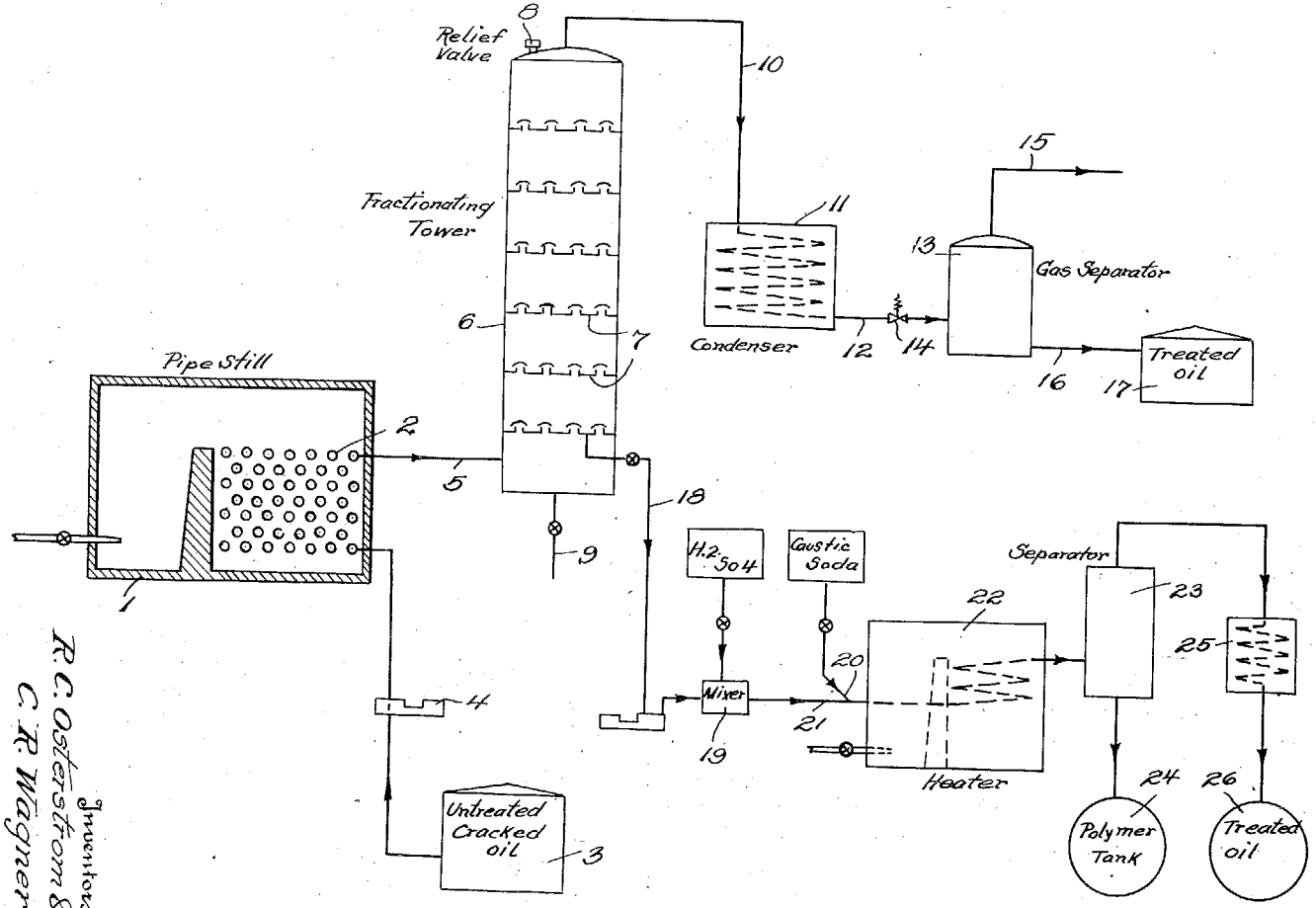
Inventors
R. C. Osterstrom &
C. R. Wagner
By W. D. McDowell
Attorney Reissued Dec. 28, 1937

Re. 20,605

UNITED STATES PATENT OFFICE 20,605

METHOD OF TREATING CRACKED PETROLEUM DISTILLATES

Rudolph C. Osterstrom, Kenilworth, and Cary R. Wagner, Chicago, Ill., assignors to The Pure Oil Company, Chicago, Ill., a corporation of Ohio Original No. 1,891,108, dated December 13, 1932, Serial No. 426,122, February 5, 1930. Application for reissue September 18, 1934, Serial No. 744,562

8 Claims. (Cl. 196—93)

This invention relates to improvements in processes for treating cracked petroleum oils and similar products resulting from the cracking of heavier oils in the vapor phase for the production of such lighter oils and products therefrom.

Cracked distillates obtained by the vapor phase cracking of hydrocarbon oils contain high percentages of unsaturated constituents and especially unsaturated constituents of a higher degree of unsaturation than the simple olefines. Such highly cracked distillates contain undesirable gum-forming and color-imparting compounds consisting of the highly reactive unsaturates which readily oxidize upon exposure to air, or when stored in tanks, to produce gummy or resinous bodies in such quantities as to render the cracked distillates unsuitable when not adequately treated for use as motor fuels or blending stocks. Hitherto it has been common in the art to effect the removal of the undesirable gum-forming and color-imparting bodies from cracked distillates obtained by the vapor phase conversion of heavier hydrocarbon oils, by bringing the vapors of such cracked oils into contact with fuller's earth which apparently acts as a catalyst in effecting the polymerization of the aforesaid undesirable compounds. Again the distillates have been treated with sulphuric acid and subsequently neutralized by an alkali to rid the distillates of objectionable color and gums.

It is a primary object of the present invention to provide an improved process for effecting the removal of these undesirable compounds which are present in the cracked distillates in a more economical and effective manner and to provide a system of treatment wherein the use of relatively expensive treating materials is reduced to a minimum and wherein only the heavier fractions of the distillates undergoing treatment require the use of a polymerizing agent, the lighter fractions being thoroughly and effectively treated to remove the undesirable compounds without requiring the use of any extraneous treating agent whatever.

For a more complete understanding of the present invention reference is to be had to the accompanying drawing wherein the figure illustrates diagrammatically apparatus used in carrying out the present invention.

Referring more particularly to this drawing, the numeral 1 designates a pipe still in the setting of which there is arranged a bank of heating tubes 2. The cracked distillate delivered to the system for treatment is continuously passed through the tubes 2 and is heated to vaporizing temperatures while passing through said tubes of the order of 500° to 650° F. This distillate is obtained from a storage tank 3 and is withdrawn from the tank and forced through the coils of the tubes 2 by means of a pump 4 which places the oil passing through the pipe still under pressures of the order of from 300 to 500 pounds per square inch. These pressures, however, are not sufficient to maintain the oils in the liquid phase at the temperatures to which the oils are heated prior to their discharge from the coils comprising the bank 2. Care is taken, however, in the operation of the still 1 to avoid heating the oils to cracking temperatures since the object of this phase of the treatment is to vaporize the oils while the latter are maintained under superatmospheric pressures without any substantial cracking of the oils. It will be understood that the oils or distillates contained in the tank 3 are obtained preferably from the operation of vapor phase systems of oil conversion wherein heavier oils are heated to vaporizing and cracking temperatures in excess of 1000° F. The subsequently condensed and fractionated distillates are then delivered to the tank 3 to remove therefrom undesirable color and gum producing compounds, and it is to the performance of this function that the present invention is directed.

A vapor discharge line 5 extends from the outlet side of the coil 2 to the lower portion of a fractionating tower 6. This tower may be of any standard construction and of sufficient mechanical strength to withstand the super-atmospheric pressures which are set up therein by the operation of the system. In this instance the tower has been shown as consisting of a plurality of horizontally arranged vertically spaced trays 7 through which the light vaporous products pass in a generally upward direction, the undesirable heavy compounds which condense under the temperature and pressure conditions existing in the tower are collected as liquids in the lower portion of the tower. In this instance, the upper portion of the tower is provided with a pressure relief valve 8 to permit of the release of abnormal pressures which may accidentally exist in the tower.

We have discovered that when cracked petroleum distillates having the boiling range of ordinary gasoline are thus vaporized to elevated but non-cracking temperatures and maintained at the same time under super-atmospheric pressure conditions for relatively prolonged periods of time, the undesirable fraction of the unsaturated compounds are apparently polymerized in the treating zone indicated by the tower 6. The polymerization is evident in the production of higher boiling point oils than the boiling points of the oils initially introduced into the system by the pump 4. These high boiling point oils, obtained by polymerization in the tower 6, are removed from the bottom of the tower by way of the valved pipe line 9 in the form of a fuel oil residue. The period of time, which is an important factor, taken by the distillates under treatment in securing this polymerization varies, of course, with the character of the charging stock and operating conditions, since the distillates may be maintained in the system for periods of time varying between 15 minutes to three hours, but preferably not in excess of 30 minutes.

The lighter oils which remain in a vaporous state following travel through the tower 6 are withdrawn by way of an overhead line 10 and pass to a condenser 11 wherein the vapors are reduced to a liquid state while still maintained under super-atmospheric pressures. These condensed oils then flow by way of a pipe line 12 to a gas separator 13. The pipe line 12 contains a pressure relief valve 14 so that the products delivered into the separator 13 will be under ordinary or atmospheric pressures. Such fixed gas as may be formed as a result of the operation is withdrawn from the top of the separator 13 by way of the pipe line 15 while the treated distillate is removed from the separator by way of a pipe line 16 and lead to a storage tank 17 as finished motor fuel.

In a typical run, in accordance with the features of the present invention, a distillate obtained by the vapor phase cracking of heavy hydrocarbon oils was delivered under a pressure of 375 pounds to the pipe still and which distillate possessed an A. P. I. gravity of 52, an initial boiling point of 95° F., an end point of 440° F., and was of a decided lemon yellow color. This stock was heated in the still to a temperature of 550° F. and fractionated in the tower 6 and this distillate when delivered to the tank 17 was found upon analysis to possess an initial boiling point of 95° F., an end boiling point of 385° F., an A. P. I. gravity of 56, and a clear water white color (Saybolt plus 25). Approximately 60% of the original charging distillate thus treated was recovered as a finished motor fuel product in the tank 17. In addition to its water white color the motor oils collected in the tank 17 possess a low or negligible gum content which remains substantially uniform under ordinary conditions of storage and handling.

The polymerized fractions which are removed from the bottom of the fractionating tower by way of the pipe line 9 were found to possess, upon analysis, an A. P. I. gravity of 20, an initial boiling point of 420° F., and an end boiling point of 700° F. The relative differences in the matter of gravity and boiling range in the cracked distillate initially introduced into the pipe still 1 and the residue removed from the bottom of the tower 6 indicate strongly the polymerization conditions which are set up in the tower 6 by subjecting the vapors of the cracked distillate to the elevated temperatures and pressures for varying periods of time.

The lower trays of the fractionating tower 6 are provided with a liquid outlet line 18 by which oils heavier than those delivered to the tank 17 but lighter than the fuel oils removed by way of the pipe line 9, are discharged from the tower 6. The oils leaving the line 18 may be termed a heavy gasoline since a typical cut thereof discloses that they possess an initial boiling point of approximately 300° F., an end boiling point of 430° F., an A. P. I. gravity of 43.0° and a Saybolt color varying from minus 10 to plus 5, and comprise from 20 to 35% of the total volume of oil delivered to the pipe still 1.

To render these heavier motor fuel oils suitable for commercial purposes, it is advisable that they should be treated with sulphuric acid and a neutralizing alkali which may be done by extending the line 18 to a mixer 19 wherein the oils are brought into contact with suitably regulated quantities of sulphuric acid. Upon leaving the mixer the oils are neutralized with caustic introduced as at 20 into the outlet line 21 of the mixer 19. These oils are then passed through a heater 22 in which they are redistilled and are finally discharged into a separating tower 23. The polymerized oils are withdrawn from the bottom of the tower 23 and delivered to a tank 24, whereas the light vaporous oils pass overhead from the tower 23, are condensed as at 25 and delivered as a finished motor fuel to the tank 26.

By this method of treatment a large part of the cracked distillate does not require treatment with any added polymerizing agent, since the conditions of temperature, pressure and time brought to bear on the vapors passing through the tower 6 are sufficient of themselves to secure the desired polymerization without necessitating the aid of extraneous treating agents. This results in a very considerable economy in operation since the expense of treating agents such as fuller's earth and sulphuric acid is reduced to a minimum, sulphuric acid treatment being only employed in connection with the heavier oils removed from the bottom of the tower by way of the outlet line 18. Moreover, the system avoids the loss of the oil or distillate itself which inevitably occurs when large quantities of treating agents are employed, and in this respect the total percent of usable distillates recovered from the system is higher than from comparable systems of which we have knowledge. Again, the system operates to avoid injury to the oils undergoing treatment. For example, if the lighter oils obtained from the system by way of the tank 17 were to be treated with concentrated sulphuric acid, a large percent of the desirable compounds present in these oils as well as the undesirable constituents, would be attacked by the acid and lost as a residue or sludge. Therefore, in accordance with the present invention these lighter oils are not in any way brought into contact with an active polymerizing agent so that there can be any injury to these light oils or loss in their total volume as a result of treatment. The heavy motor fuel oils removed from the fractionating tower 6 by the outlet line 18 are capable of withstanding treatment with sulphuric acid without injurious results or "burning" of the oil so that there is a large recovery of this relatively heavier fraction of the distillates as a treated, gum-free motor fuel of desired color. The polymer-containing fraction removed from the bottom of the tower 6 by way of the pipe line 9 is used preferably as a fuel oil and is not subjected to further treatment.

The present invention thus provides for the vaporizing of the cracked distillates and the fractionation thereof at high pressures by which the necessary time factor in obtaining polymerization reactions is secured in a tower of ordinary size. The use of pressure is also advantageous in promoting the desired polymerization reactions, because one molecule of a polymerized product occupies no more space than a single molecule of the compounds entering into the polymerizing reaction, the reactions being speeded up, as it were, by the use of higher pressures.

When an ordinary cracked vapor phase distillate is fractionated at low pressures and in the usual manner, and where the vapors have a velocity of approximately one foot per second through a fraction tower of the usual type, the resulting product is yellow in color from the beginning of the distillation to the end. We have discovered that when the fractionation is slowed down so that the vapors are subjected to temperatures above 200° F. for a period of minutes in an ordinary fractionating tower, colorless products distill over, and from this basis we have continued to increase the elements of time, pressure and temperature to secure the most practical conditions for commercial operation. In ordinary operations less than 2% of the cracked distillate under treatment is lost as a result of polymerization reactions, and fully 50% of the distillate so treated may be recovered in the form of a gum-free and colorless liquid which requires no treatment with catalyzing agents. Ordinarily, between 50 and 75% of the distillate under treatment may be so recovered after treatment without a catalyzing agent, thus leaving only the high boiling fractions with a distillation range of between 300° F. and 430° F. which require polymerization treatment with, for example, sulphuric acid. Of this latter fraction, approximately 95% thereof is obtained as a salable motor fuel product of desired color and freedom from gums.

What is claimed is:

1. The method of treating cracked low boiling petroleum oils containing unsaturated compounds to remove therefrom gum-forming and color-imparting bodies, which comprises heating such oils to temperatures above their normal vaporizing temperatures but insufficient to effect any substantial cracking thereof, introducing such heated oils alone and unmixed with other substances into a fractionating zone wherein said oils in a vapor state are maintained under super-atmospheric pressures, retaining the oils in said zone while in substantially the vapor state and under the influence of said pressures for a sufficient period of time not in excess of thirty minutes to effect the formation of compounds having a higher boiling range than that of the oils originally heated, withdrawing from one portion of said fractionating zone the treated vaporized oils, and separately withdrawing from another portion of said fractionating zone as liquids the oils containing the high boiling compound.

2. The method of treating cracked low boiling petroleum oils containing unsaturated compounds to remove therefrom gum-forming and color-imparting bodies, which comprises subjecting such oils alone while under super-atmospheric pressures to temperatures above their normal vaporizing temperatures but below those at which any appreciable cracking thereof is effected, introducing such vaporized oils alone and unmixed with other substances into a fractionating zone wherein the oils are maintained under said super-atmospheric pressures, retaining the oils in said zone while in substantially the vapor state and under the influence of said pressures for a sufficient period of time not in excess of thirty minutes to effect the formation of compounds of higher boiling point than the oils originally heated, withdrawing said high boiling compounds as liquid oils from said fractionating zone, separately removing the vaporized oils from another portion of said fractionating zone and condensing the same without release of pressure, releasing the pressure on said condensed oils and removing lighter gaseous products therefrom.

3. The method of treating cracked low boiling petroleum oils containing unsaturated compounds to remove therefrom gum-forming and color-imparting bodies, which comprises subjecting such oils alone and unmixed with other substances to temperatures sufficiently high to effect their complete vaporization without any material cracking of the same, introducing such vaporized oils alone into a fractionating zone wherein the oils are maintained under super-atmospheric pressures, retaining the oils in such zone while in substantially the vapor state and under the influence of said pressures for a sufficient period of time not in excess of thirty minutes to effect polymerization of the undesired unsaturated compounds contained therein, removing from one point of said fractionating zone the undesired compounds in the form of a heavy liquid oil, and in removing from another point of said fractionating zone the desired treated vapors, and condensing and collecting said vapors.

4. The method of treating cracked low boiling petroleum oils containing unsaturated compounds to remove therefrom gum-forming and color-imparting bodies, which comprises subjecting such oils alone and unmixed with other substances to temperatures sufficiently high to effect substantially their complete vaporization without any material cracking of the same, introducing such vaporized oils alone into a fractionating zone wherein the oils are maintained under super-atmospheric pressures and held in said zone for a sufficient period of time varying between fifteen minutes and three hours in substantially the vapor state to effect the polymerization of the undesired compounds contained therein, withdrawing the treated vapors from the upper portion of said fractionating zone and condensing and collecting the same, separately withdrawing from the lower portion of said fractionating zone a heavy liquid oil containing the undesired polymerized compounds, and withdrawing from an intermediate portion of said zone an intermediate fraction of said liquid oil and subjecting said intermediate fraction to treatment with polymerizing reagents.

5. The method of removing gum-forming and color-imparting bodies from low boiling cracked oil vapors which consists in contacting said vapors in a fractionating zone with a plurality of bodies of liquid hydrocarbons at temperatures above the vaporizing temperature of gasoline but below cracking temperature and at high super-atmospheric pressure for a period of time ranging from approximately 15 minutes to 3 hours, and condensing the degummed vapors.

6. Method in accordance with claim 5 in which the liquid hydrocarbons are condensed fractions of the vapors.

7. Method in accordance with claim 5 in which the vapors are contacted with the liquid bodies at temperatures of 500°–650° F.

8. Method in accordance with claim 5 in which the vapors are contacted with the liquid bodies at temperatures of 500°–650° F. and at pressures of 300–500 pounds per square inch.

RUDOLPH C. OSTERSTROM.
CARY R. WAGNER.